US005674347A

United States Patent [19]

Edwards et al.

[11] Patent Number: 5,674,347

[45] Date of Patent: Oct. 7, 1997

[54] APPARATUS AND METHOD FOR PREPARING PRINTING LABELS

[75] Inventors: Russell James Edwards, Jacksonville, Fla.; Masao Funo, Saitama-Pref., Japan; Richard Wayne Abrams, Jacksonville, Fla.; Kiyoshi Imai, Saitama-Pref.; Hirokazu Kitagawa, Chiba-Pref., both of Japan; Borge Peter Gundersen, Tikob, Denmark; William Edward Holley, Ponte Vedra Beach, Fla.; Thomas Christian Ravn, Helsignor, Denmark; Mark Edward Schlagel; Daniel Tsu-Fang Wang, both of Jacksonville, Fla.

[73] Assignee: Johnson & Johnson Vision Products, Inc., Jacksonville, Fla.

[21] Appl. No.: 432,925

[22] Filed: May 1, 1995

Related U.S. Application Data

[63] Continuation-in-part of Ser. No. 257,789, Jun. 10, 1994, Pat. No. 5,565,059.

[51] Int. Cl.[6] .......................... B23Q 15/013; B23Q 15/24; B65C 9/40

[52] U.S. Cl. .......................... 156/351; 156/361; 226/45; 493/13; 493/14; 493/15; 493/24

[58] Field of Search .......................... 156/378, 495, 156/350, 351, 510, 523, 361; 53/131.5, 131.3; 493/11, 13, 14, 15, 24; 226/27, 45

[56] References Cited

U.S. PATENT DOCUMENTS

| | | | |
|---|---|---|---|
| 3,607,537 | 9/1971 | Hofe et al. | 156/277 |
| 3,715,856 | 2/1973 | Borel | 156/268 |
| 3,823,050 | 7/1974 | Mers | 156/493 |
| 3,958,051 | 5/1976 | Smith | 428/42 |
| 4,220,493 | 9/1980 | Wehr et al. | 156/380 |
| 4,240,862 | 12/1980 | Ishiyama | 156/361 |
| 4,363,685 | 12/1982 | White | 156/212 |
| 4,400,230 | 8/1983 | Wyslotsky | 156/495 |
| 4,490,963 | 1/1985 | Knudsen | 53/131.5 |
| 4,508,524 | 4/1985 | Romagnoli | 493/11 |
| 4,512,844 | 4/1985 | Kbiella | 156/510 |
| 4,559,755 | 12/1985 | Romagnoli | 53/131.5 |
| 4,790,118 | 12/1988 | Chilcoate | 53/411 |
| 5,000,725 | 3/1991 | Bauknecht | 493/11 |
| 5,230,205 | 7/1993 | Hautemont | 156/361 |
| 5,286,317 | 2/1994 | Treat | 156/387 |

FOREIGN PATENT DOCUMENTS

| | | |
|---|---|---|
| 460201 | 10/1949 | Canada . |
| 1 963 956 | 8/1971 | Germany . |
| 2 355 208 | 9/1974 | Germany . |
| 57-084725 | 5/1984 | Japan . |
| 5-154946A | 6/1993 | Japan . |
| 1 403 625 | 8/1975 | United Kingdom . |

*Primary Examiner*—Daniel Stemmer

[57] ABSTRACT

An apparatus for the processing and segmenting of a cover-forming laminate web or sheeting structure which is adapted to interconnect a plurality of containers, such as the base members of blister packages each of which is designed to contain a hydrophilic contact lens in a sterile aqueous solution. More specifically disclosed is an apparatus for the imprinting, perforating, slitting and cutting the laminated web structure such that the severed laminate segments constitute printed covering label for an array of such containers, and whereby the laminated web or sheeting segment may be severed along weakening or perforation lines so as to provide a separable packaging arrangement for individual of the containers which are subsequently adhered thereto.

18 Claims, 13 Drawing Sheets

APPARATUS AND METHOD FOR PREPARING PRINTING LABELS

The present application is a continuation-in-part application of parent application for APPARATUS AND METHOD FOR PREPARING PRINTING LABELS, Ser. No. 08/257,789, filed Jun. 10, 1994 now U.S. Pat. No. 5,565,059.

BACKGROUND OF THE INVENTION

FIELD OF THE INVENTION

The present invention relates to an apparatus for the processing; in effect perforating, cutting and severing a continuous laminated web or sheeting structure into cover and printed label-forming segments each of which is adapted to interconnect and sealingly cover a plurality of containers, such as the base members of blister packages designed to each respectively contain a hydrophilic contact lens in a sterile aqueous solution.

More specifically, the subject invention pertains to the provision of an apparatus for the perforating, slitting and cutting into specified segments of the laminated web or sheeting structure such that each severed segment constitutes a printed covering label for precise placement on an array of such containers. The apparatus contemplates the laminated web to be imparted with a plurality of spaced weakening or perforation lines prior to segmenting thereof so as to provide individually detachable packaging arrangements for each individual container from the array of interconnected containers.

Moreover, the invention is also directed to a novel and unique method of perforating, slitting and severing into segments a continuous web or sheeting of a laminated material, such that each severed segment is adapted to form a unitary covering and printed label for an array of containers, each containing a hydrophilic contact lens in a sterile aqueous solution through utilization of the inventive apparatus.

The packaging of hydrophilic contact lenses in a sterile aqueous solution is well known in the contact lens manufacturing technology. In particular, packaging arrangements of that type generally consist of so-called blister packages adapted to be employed for the storage and dispensing of the hydrophilic contact lenses for use by a medical practitioner or by a consumer who intends to wear the contact lenses. Such hydrophilic contact lenses, which may be disposable after a single wear or short-term use, are inexpensively manufactured from suitable hydrophilic polymeric materials, for example, copolymers of hydroxyethylene methacrylate containing from about 20% to 90% or more of water, depending upon the polymer composition. These contact lenses are generally stored in a sterile aqueous solution, ordinarily consisting of an isotonic saline solution, in order to prevent dehydration and to maintain the lenses in a ready-to-wear condition.

A container of the foregoing type normally comprises a base member which is molded from a suitable injection-molded or thermoformed plastic material, for instance, such as polypropylene, and incorporates a cavity adapted to house the contact lens in the aqueous solution, and which is sealingly closed by a label-forming cover, preferably in the form of a flexible multi-layered laminated web or sheeting structure to provide a so-called blister package. This type of packaging arrangement has found widespread use in view of the inherently advantageous storing properties thereof and the easy-to-dispense nature of the package by simply peeling the adherent cover from the base member, thereby enabling a user to gain ready access to the contact lens which is contained in the cavity of the base member. For example, a blister package which is adapted to provide a sterile sealed storage environment for a disposable, essentially single-use hydrophilic contact lens, which may normally be worn for a period of between about 8 to 16 hours during any 24-hour period, has the lens immersed in a sterile aqueous solution within the package, as is described in copending U.S. patent application Ser. No. 08/257,795, filed Jun. 10, 1994, pending, which is commonly assigned to the assignee of the present application and the disclosure of which is incorporated herein by reference.

In the above-mentioned copending U.S. patent application, the blister package for storing and dispensing a hydrophilic contact lens includes an injection-molded or thermoformed plastic base portion or member incorporating a molded cavity which is surrounded by an outstanding planar flange extending about the rim of the cavity. A flexible cover sheet, such as a multi-layered laminated structure is adhered to the surface of the flange in order to sealingly enclose the cavity in a generally liquid-tight manner. The surface of the cover sheet may constitute a label and be imparted suitable printing indicia informative of the product stored in the blister package, the name and address of the manufacturer, incorporate various decorative designs and logos as desired; and also provide for changeable information, such as lot numbers, expiration dates, fitting parameters, lens power, and the like in addition to the foregoing, such as may be required by FDA regulations.

Heretofore, such blister packages have been generally sold as individual or single units and the imprinted information provided thereon is completed for each blister package.

However, when it is intended to sell arrays or multiples of such blister packages which are detachably interconnected, each containing respectively a single hydrophilic contact lens, the opportunity may arise for a diverter to pass off the relatively inexpensive disposable product contained in each of the respective detached blister packages as a more expensive single unit item. In essence, such single-use or disposable contact lenses could be conceivably passed off as more expensive reusable contact lenses, potentially causing significant economic losses to the manufacturer and sellers, while also raising the possibility of potential legal liabilities in the event that the product is not properly used or worn for extended periods of time so as to result in physical harm to a user.

At this time, there has accordingly been addressed the concept of the development of new and unique packaging arrangements of the blister package type, particularly for the containment of hydrophilic contact lenses in a sterile aqueous solution, wherein a plurality of base members, each formed with a cavity for containing a hydrophilic contact lens in a sterile saline solution, are adapted to be positioned in a contiguous array and sealingly covered by a single or unitary flexible cover sheet, the latter of which is preferably in the form of a flexible multi-layered imprinted label-forming laminate. In this instance, the laminate is provided with weakening lines, such as by micro-perforating, intermediate each of the respective base members so as to enable individual segments of the flexible laminate to be detached along the weakening lines or perforations without affecting the integrity of the sealed blister packages, and in conjunction with the therewith associated base member, to be separated from the array when it is desired to gain access to the single contact lens contained therein.

In essence, the lines of perforations which are present in the laminate forming the unitary cover sheet for an array of interconnected blister packages provides an easy opening feature enabling a consumer to readily separate individual of the blister packages without damaging the sterile integrity of an adjacent blister package. Moreover, the perforations still provide adequate strength to remain for the laminate cover sheet material to enable automated material handling thereof; for instance, after post-hydration and shipment of the packages to the consumer.

This type of array of multiple interconnected blister packages enables the compact packaging of a plurality of such arrays, each possessing a specified number of contact lens-containing base members interconnected by a single flexible cover sheet, within the confines of a suitable container, such as a rigid paperboard carton. In the carton there may be compactly stored a plurality of interleaved and superimposed layers of arrays of blister packages; for example, each array having five interconnected blister packages each with a single contact lens disposed therein. The carton may be designed to store six arrays of blister packages, positioned in three tiers each consisting of two inverted and interleaved arrays, for a total of thirty blister packages; in essence, containing a 30-day supply of contact lenses for respectively one eye of a user. A packaging arrangement for contact lenses of that type which is in the form of arrays of interconnected blister packages is disclosed in applicants' copending U.S. patent application Ser. No. 08/257,796, filed Jun. 10, 1994, entitled PACKAGING ARRANGEMENT FOR CONTACT LENSES, pending, which is commonly assigned to the assignee of the present application and the disclosure of which is incorporated herein by reference.

The blister packages which are formed through the intermediary of this structure comprise a plurality of contiguously linearly arranged thermoformed or injection-molded base members each possessing a cavity for housing a hydrophilic contact lens in a sterile saline solution, and wherein the resultant array of such base members; for example, five (5) base members, is adapted to be sealingly covered and interconnected by a single flexible multi-layered laminated web segment which also forms a common printed label, preferably of the kind as disclosed in copending U.S. patent application Ser. No. 08/106,386, filed Aug. 13, 1993, now abandoned, which is commonly assigned to the assignee of the present application, and the disclosure of which is incorporated herein by reference.

In the foregoing disclosure, the multi-layered laminated web includes an outer layer of a plastic film material which is adhesively bonded to the surface of a supporting metallic foil, such as aluminum, or in lieu of the latter may be coated with silicon oxide, and in which the outer layer is illustrated as being double-side printed; in effect, on both opposite surfaces, although it is possible to contemplate imparting the printing to only one surface of the outer plastic film layer. The surface of the outer plastic film layer which faces towards and is adhered to the metallic foil (or coated with silicon oxide) is imprinted with suitable indicia and legends which may consist of permanent information regarding the manufacturer and the product, logos, instructive material, and decorative and advertising indicia relative the product in the blister package; whereas the opposite or exterior surface of the outer plastic film material layer may be imprinted with suitable variable information, such as expiration dates, lot/batch numbers, fitting parameters and other data specific to the packaged product. The interior surface of the outer plastic film material layer may be imprinted through the intermediary of suitable lithographic printing, either in single color or multi-colors and also provided with an appropriate printed background; whereas the variable information specific to the product which is imprinted on specific areas of the outwardly facing surface of the outer film layer, may be printed thereon through thermal transfer printing, although the foregoing is set forth by way of example only, and other printing methods may be readily employable.

SUMMARY OF THE INVENTION

Accordingly, in order to be able to provide the segments of the multi-layered laminate web or sheet which are dimensioned to be able to be adhesively positioned on an array of base members in order to form covers and printing labels for each of the resultingly interconnected blister packages containing the contact lenses, the present invention contemplates the provision of an apparatus containing structure for conducting a continuous web of the laminated web material to a printing station for imparting thereto specific changeable printing characters representative of the product in the blister package; and for advancing the printed laminate web to a perforating station for imparting predetermined spaced perforations transverse of the longitudinal advance of the web which are definitive of the widths of the individual blister packages so as to be able to extend therebetween; conveying the transversely perforated web past a slitting station including a slitting blade for dividing the web in the longitudinal direction thereof into at least two widths each conforming to the transverse width of the blister packages onto which the laminate is to be placed; and advancing the slit web widths to a cutting station having a transversely extending cutting blade for severing the web into individual segments each of a length in conformance with the length of the array of blister packages which are adapted to be covered by the segment forming the printed labels. Incorporated is a novel structure for intermittently drawing the web of the laminate material in a precisely dimensioned advancing motion so as to correlate the accuracy in the advance thereof with a scanning of the indicia or characters imprinted on the laminated web. Since the graphic repeats on the foil web are not exact from the information, the sensors scan the preprinted indicia or the field on the foil web to determine the exact pull length for character printing, character verification by a vision system, perforating and cutting. This will ensure the exactness in the lengths of the severed segments which are adapted to be placed and adhesively fastened to contact lens-receiving base members for forming the array of blister packages.

More specifically, the invention contemplates the provision of an apparatus as described herein which incorporates sensors for scanning indicia or characters imprinted on the laminated web so as to provide control over the intermittent advance and exactness thereof by the laminated web so as to enable severing of the web into accurately dimensioned segments prior to placement of the segments on an array of base members.

The invention also contemplates the provision of an apparatus as described herein whereby the perforations transversely extending across the laminated web are implemented through a plurality of rotatable perforating elements contacting the surface of the laminate web and which are spaced from each other in the direction of advance of the web so as to define the widths of each of the blister packages which are to be formed upon being covered by the segments of the laminated web material.

Another aspect of the invention resides in the provision of an apparatus as described herein, wherein sensors operatively scanning indicia on the web correlate the incremental forward advance of the laminated web with the imprinted indicia or characters thereon, and whereby the sensors in response to the scanned characters imparted to the surface of the web by the printing device at the printing station, control the advance of the web and the precision thereof.

Still another aspect of the invention resides in the provision of a novel method for printing, imparting perforations, longitudinal slits and subsequent severing into segments of precise locations and lengths from a continuous web supply so as to produce severed segmented and perforated portions from the web which are adapted to be placed in an accurate alignment over contiguously positioned base members each containing a contact lens in order to form the array of interconnected blister packages which are adapted to be separated into individual blister packages along the transverse perforations extending therebetween without affecting the integrity of the contents of the blister packages.

In accordance with the teachings herein, the present invention provides apparatus for producing printed labels forming a strip of covers interconnecting a plurality of package bases, with each strip of covers being a segment severed from a continuous length of a laminated foil. A supply roll has a continuous strip of laminated foil thereon, with the laminated foil strip comprising a series of individual covers, with each individual cover having background graphics and a print field on which appropriate product data is to be printed. A printer has drive rollers which advance the laminated foil strip intermittently therethrough between successive printings by a printhead on successive print fields of successive labels. A photodetector is positioned to detect the widthwise borders between the background graphics and the print fields to accurately control the position of the laminated foil strip in the printer for each printing of appropriate product data on each print field.

In greater detail, a foil level sensor is positioned adjacent to the supply roll and includes a beam projector which projects a narrow beam of light along a path, which will be clear when the supply roll is nearly empty, to a photodetector, an output from which indicates that the supply roll is nearly empty. A foil guide assembly receives the laminated foil strip from the supply roll, and maintains the laminated foil strip under tension as it enters the printer. The foil guide assembly includes a pivoted tensioning arm, the weight of which maintains the laminated foil strip under tension, and upper and lower detectors detect upper and lower positions of the pivoted tensioning arm. The upper position detector deactivates the drive rollers in the printing machine, while the lower position detector activates the drive rollers. A stock box receives the printed laminated foil strip from the printer for temporary accumulation therein.

A perforation cutter perforates the printed laminated foil strip output of the printer. A flying knife blade perforates the laminated foil strip widthwise a number of times, once between each pair of adjacent covers in each strip of covers. The flying knife blade is supported on a shaft which is driven by a stepper motor to rotate during a cut, and the strip of laminated covers is perforated between the blade edge and a roller positioned widthwise beneath the strip of laminated covers. A first photodetector is positioned to detect the widthwise borders between the background graphics and the print fields which determines where the perforation cutter will cut the perforations. A second photodetector is positioned to detect the background graphics which determines the border between the end of one strip of covers and the beginning of the next successive strip of covers, which is not perforated. A feed roller unit is responsive to the first and second photodetectors to position each widthwise border between adjacent covers in a cover strip beneath the flying knife cutter to provide perforations thereat, while perforations are not provided at borders between successive strips of covers.

The feed roller unit pulls the printed laminated foil strip output of the printer over a suction brake, which maintains the laminated foil strip under tension, and into the perforation cutter. A vacuum valve is provided to control the vacuum applied to the suction brake and thereby the tension on the laminated foil strip through the perforation cutter. The feed roller unit includes upper and lower rollers, between which the laminated foil strip is intermittently driven by a stepper motor. The tension on the laminated foil strip is controlled by adjusting the force with which a spring presses the two rollers together. A release level is provided to release and disengage the two drive rollers.

A cleaning unit is provided for cleaning the perforated laminated foil strip at the output of the perforation cutter. The cleaning unit includes a vacuum applied through vacuum ducts and contact cleaning strips on each side of the laminated foil strip.

The laminated foil strip is driven from the feed roller unit into a dance roller unit, which has a dance roller which maintains the laminated foil strip under tension as it proceeds through a subsequent optical inspection station. The dance roller unit includes a pivoted tensioning arm on which the dance roller is mounted, the weight of which maintains the laminated foil strip under tension. Upper and lower detectors detect upper and lower positions of the pivoted tensioning arm. The upper detector deactivates drive rollers in a subsequent feed roller unit, and the lower position detector activates the drive rollers.

In accordance with one advantageous feature of the present invention, after the printer prints appropriate product data on successive print fields of successive labels, the printed strip of laminated foil is directed into an optical inspection station which has at least one camera positioned over the strip of covers to provide a pixel image of each printed field of each cover, which is analyzed using image analyzing techniques for proper print position, print quality, and the correctness of the printed information. A photodetector controls operation of the camera by detecting each widthwise border between the background graphic field and the print field. A circular array of optical fibers in the optical inspection station illuminates the field of view of each camera.

The present invention also provides apparatus as described hereinabove having a second feed roller unit which pulls the laminated foil strip through the optical inspection station and directs the laminated foil strip into a second cutting unit which cuts the laminated foil strip between successive strips of labels. A separating unit is provided for separating strips of labels which have passed inspection in the optical inspection station from strips which have failed inspection.

In greater detail, the laminated foil strip includes two side by side strips of individual covers thereon, and the apparatus further includes a slit cutter which slits the side by side strips of covers lengthwise down the middle to produce two strips of covers. A transfer unit is provided for transferring side by side strips of labels which have passed inspection to a packaging machine. The packaging machine includes an endless conveyor comprising a linked series of support platens, and each support platen supports a two row array of package bases therein. The separating unit also includes a narrow ramp which divides and separates the two strips by a distance equal to the distance between adjacent rows of package bases supported in each pallet in the packaging machine. The separating unit also includes a pivoted trap door, and a reject bin is positioned therebelow. Strips of covers which have failed inspection in the optical inspection station are deposited in the reject bin by actuating the pivoted trap door.

BRIEF DESCRIPTION OF THE DRAWINGS

Reference may now be had to the following detailed description of exemplary embodiments of the invention, taken in conjunction with the accompanying drawings; in which.

DETAILED DESCRIPTION OF THE DRAWINGS

Figure 1:
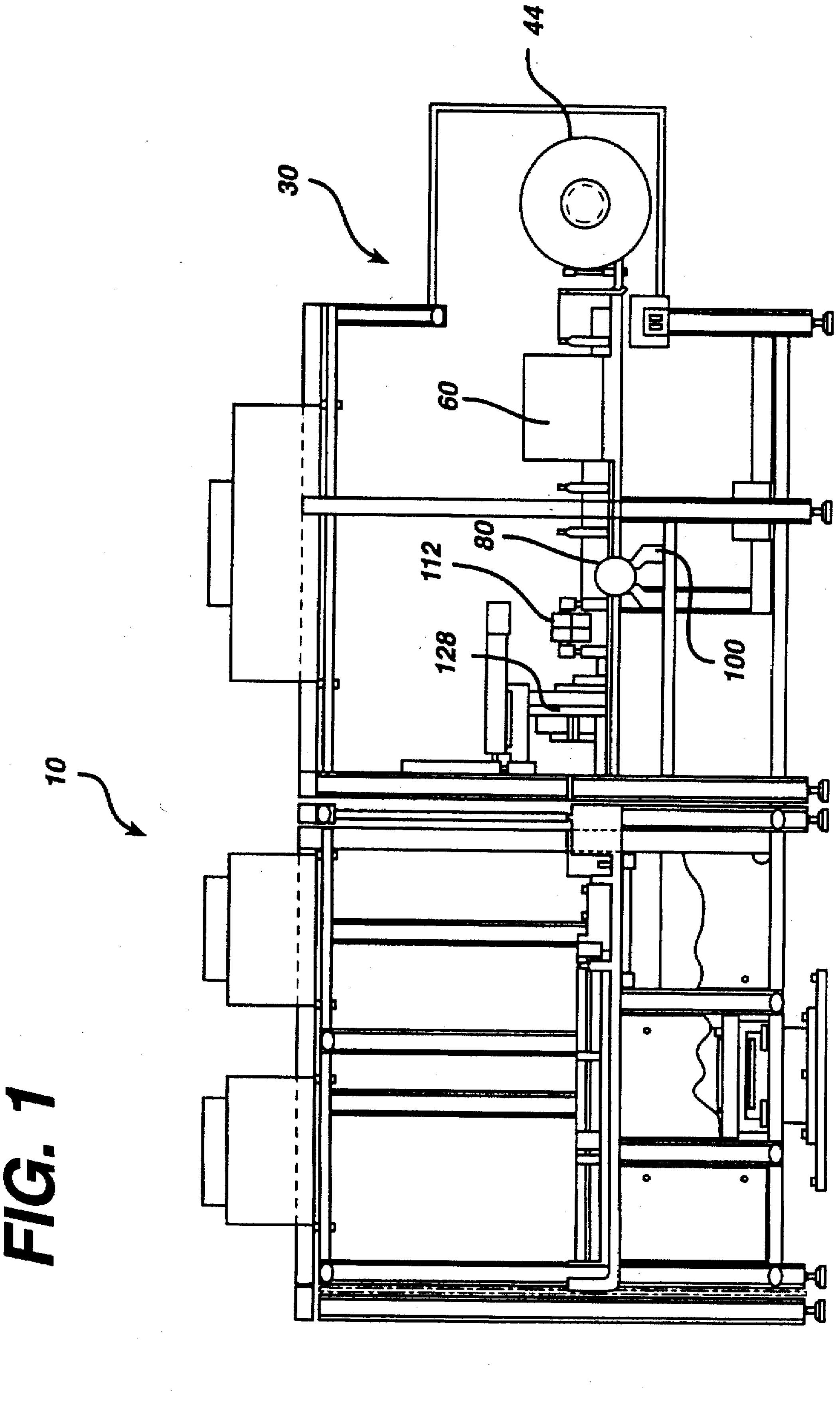
FIG. 1 illustrates a generally diagrammatic side elevational view of an installation for the assembly of blister packages for the containment of contact lenses.
Figure 2:
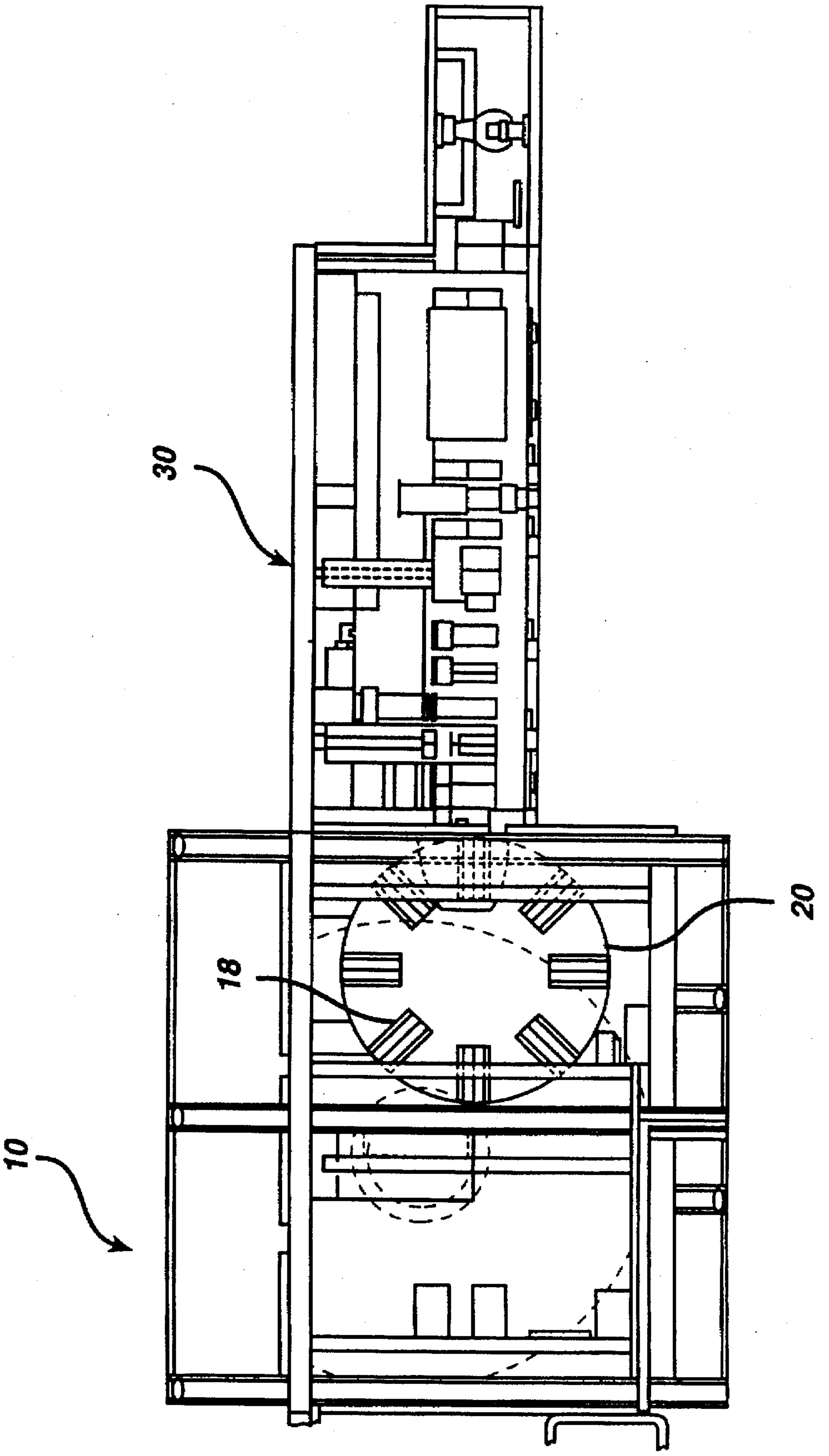
FIG. 2 illustrates a top plan view of the installation of FIG. 1.
Figure 9:
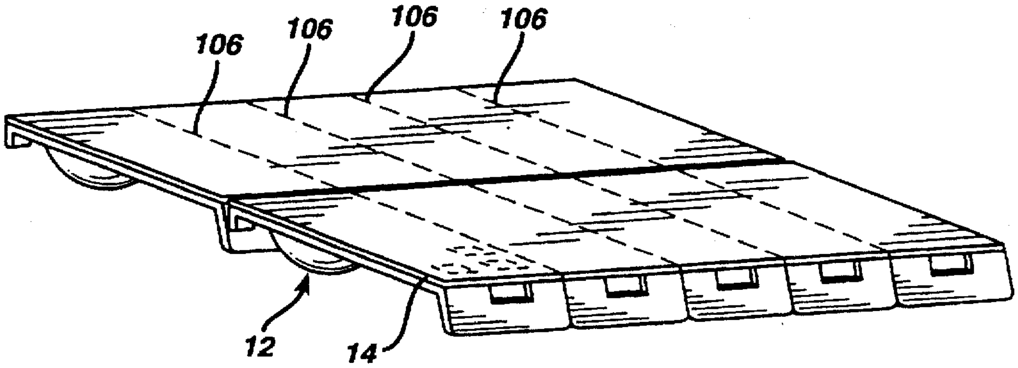
FIG. 9 illustrates the placement of a pair of segmented web portions as shown in FIG. 8 in side-by-side relationship onto a plurality of base members for the formation of arrays of blister packages containing the contact lenses.

Referring specifically to FIGS. 1 and 2 of the drawings, there is diagrammatically disclosed an installation 10 for the packaging of contact lenses in arrays of so-called blister packages 12 comprising base members which are sealingly covered and connected by a single laminated flexible cover or sheet 14 adapted to constitute printed labels for each of the blister packages, as shown in FIG. 9 of the drawings. The installation 10 is described in detail in the disclosure of copending U.S. patent application Ser. No. 08/257,787, filed Jun. 10, 1994 pending, which is commonly assigned to the assignee of this application, and the disclosure of which is incorporated herein by reference.

In essence, in the installation 10, the contact lenses are each respectively immersed in a sterile saline solution contained in the cavity of a base member of a blister package 12, the latter of which is described in detail in the disclosure of copending U.S. patent application Ser. No. 08/257,795, filed Jun. 10, 1994 pending, and copending U.S. patent application Ser. No. 08/257,796, filed Jun. 10, 1994 pending, both of which are assigned to the common assignee of the present application and the disclosures of which are incorporated herein by reference.

Briefly, each of the base members is adapted to be positioned in a recess formed in transfer pallet 18, whereby each pallet may be provided with ten (10) recesses, such as in two rows each of five (5) recesses, each adapted to house respectively one base member containing a contact lens in the sterile saline solution. The process for equipping such pallets with contact lens-filled base members may be implemented through a suitable dial arrangement in which a turntable 20 is rotationally indexed to come into alignment with a placement device for positioning segments of a flexible laminate material over each of the arrays of base members containing the contact lenses so as to interconnect a linear array of five base members and form the arrays of blister packages as shown in FIG. 3.

The apparatus for preparing the laminated material segments which essentially forms the printed label cover for each of the blister packages 12 and which also provides for the formation of two parallel rows each of five such blister package arrays, for instance, as shown in FIG. 9 of the present application and as discussed in detail hereinbelow, is now elucidated with regard to FIGS. 3 through 6 of the drawings.

Figure 3:
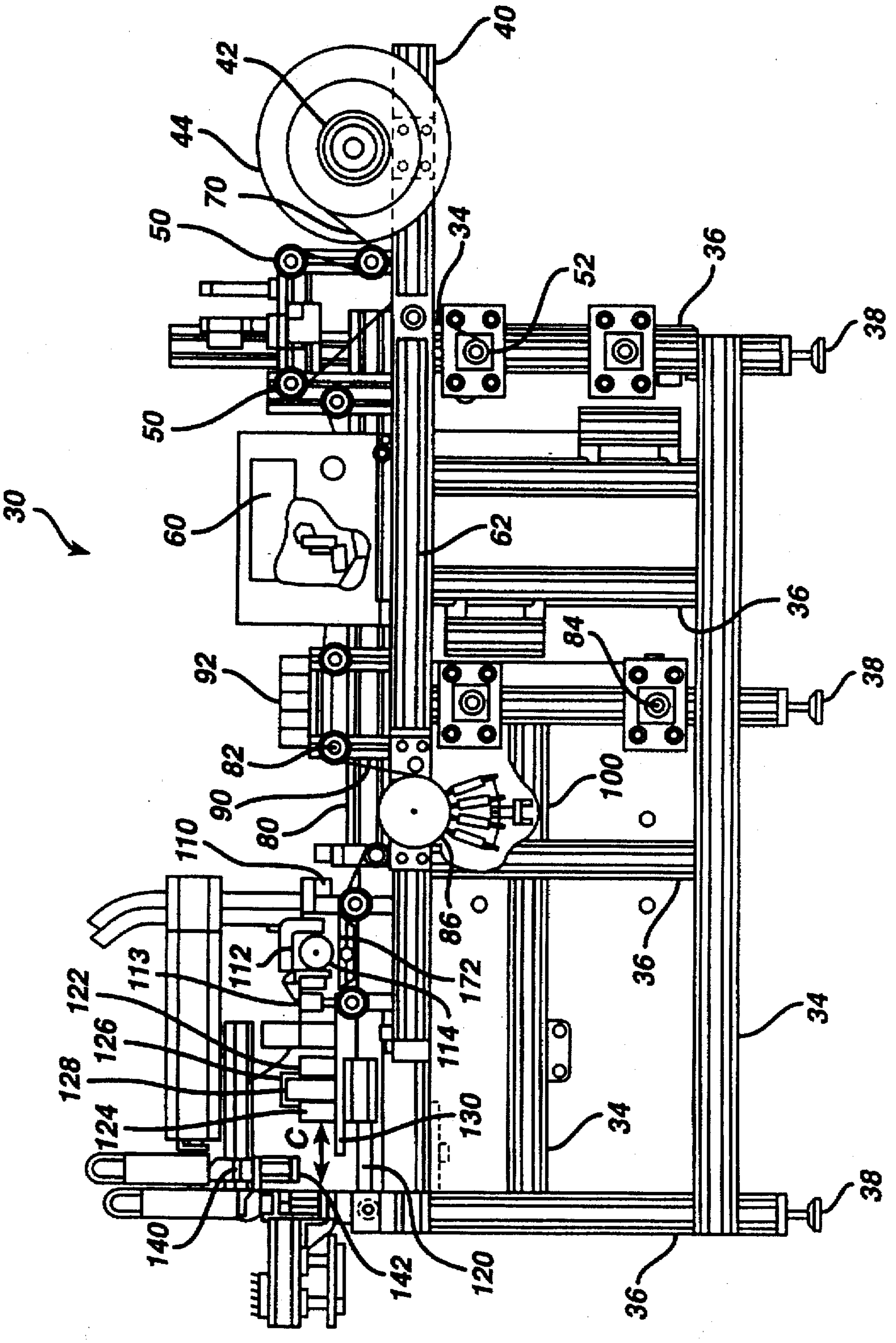
FIG. 3 illustrates a side elevational view of the apparatus pursuant to the invention for imprinting, perforating, slitting and cutting into segments a continuous web of a laminated material preparatory to placement thereof on a plurality of contact lens-containing base members so as to form an array of blister packages commonly interconnected by the severed segment.
Figure 4:
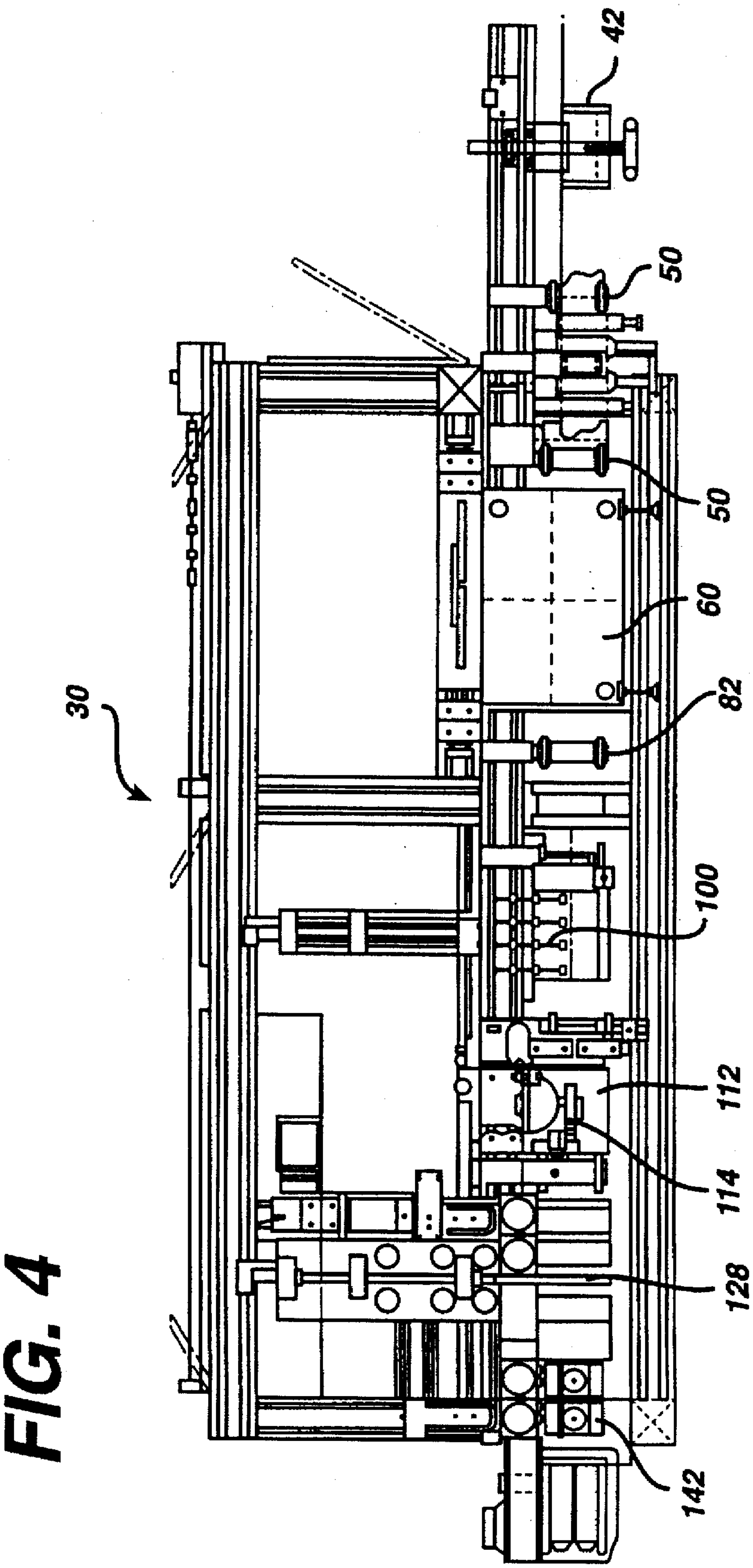
FIG. 4 illustrates a plan view of the apparatus of FIG. 3.
Figure 5:
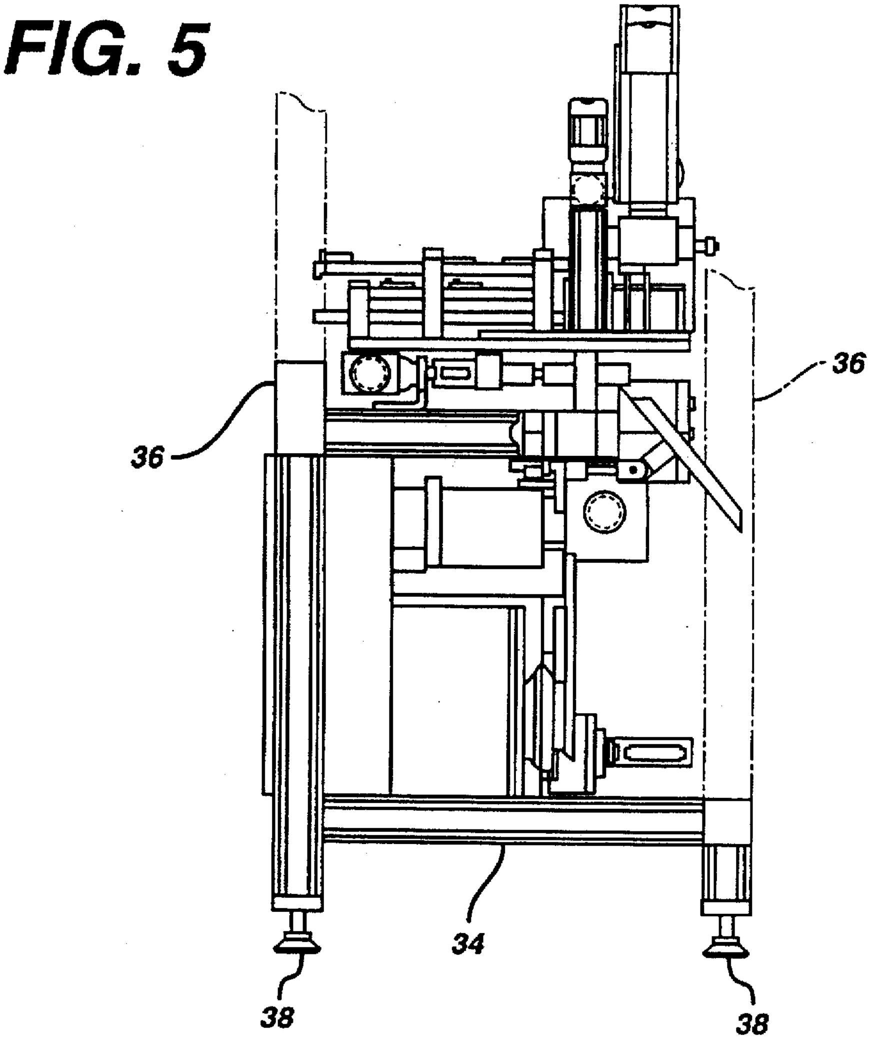
FIG. 5 illustrates, generally diagrammatically, an elevational sectional view of the apparatus taken along line 5—5 in FIG. 3.

Referring particularly to FIGS. 3 through 5, there is diagrammatically illustrated an apparatus 30 processing a multi-layered flexible laminate to produce the printed label covers for the array of blister packages, with such laminate being preferably of the type disclosed in copending U.S. application Ser. No. 08/257,795, filed Jun. 10, 1994, pending, and which is supplied from a continuous supply roll of the laminate material.

The apparatus 30 which is designed to provide specific product-identifying printing on the laminate material, perforations, slitting and cutting operations to provide for the separated cover segments for placement on the arrays of base members in the installation 10, as mentioned hereinbefore, basically includes a stationary frame structure of rigid construction including a plurality of horizontally extending support beams 34 interconnecting uprights 36 possessing leg sections 38 for firmly supporting the apparatus on a base or floor surface. On a horizontal beam extension 40, there is located a rotatably journaled shaft and pulley unit 42 on which there is adapted to be rotatably mounted a continuous supply roll 44 of the flexible laminate material, the latter being of a width which corresponds to the width A of two parallel rows of base members of blister packages located in contacting end-to-end position, as shown in FIG. 9 of the drawings, as would be the orientation thereof on the pallets 18 in installation 10. The web of laminate material which is unwound from the supply roll 44 for transport through apparatus 30 is entrained over a plurality of idler rollers collectively designated by 50, including a tension member in the form of a device 52 which is intended to maintain a predetermined variable tension on the web 70 of laminate material dispensed from the supply roll 44 as the material enters the apparatus 30. Alternatively, a weighted roller device or a constant tensioner device may be substituted for the illustrated variable tensioner member 52 which is in the form of a roller unit.

The laminate web 70 is conducted through a printing unit 60 which is mounted on an upper support beam structure 62 of the apparatus 30, such that suitable indicia, characters or legends, preferably, although not necessarily, by thermal printing, are adapted to be imprinted on the upper surface 72 of the laminate web 70 at specific spaced intervals within designated areas 74, 76, 78 on each segment of the laminate web source to define lots, batch numbers, expiration dates, and fitting parameters, such as the power of the contact lens, for each respective blister package which is to be produced in the installation 10. Fixedly mounted in the apparatus 30 is a smooth-surfaced perforating drum 80 located downstream of a set of idler rollers, collectively identified by 82, and a dancer roller arrangement 84 for maintaining a predetermined longitudinal tension on the imprinted laminate web 70 as the latter is conveyed from the printing unit 60. The laminate web 70 is entrained about the lower portion of the circumferential surface 86 of the perforating drum 80 so as to be transported in slidable surface-contact therewith.

Positioned on a support structure 90 of the framework of the apparatus 30 which supports idler rollers 82 is a sensor arrangement 92, such as a camera unit, which is adapted to scan characters imprinted onto the surface 72 of laminate web 70 by the printing unit 60, as well as sensors (not shown) in the surface 86 of stationary drum 80, for a purpose as elucidated hereinbelow.

Figure 6:
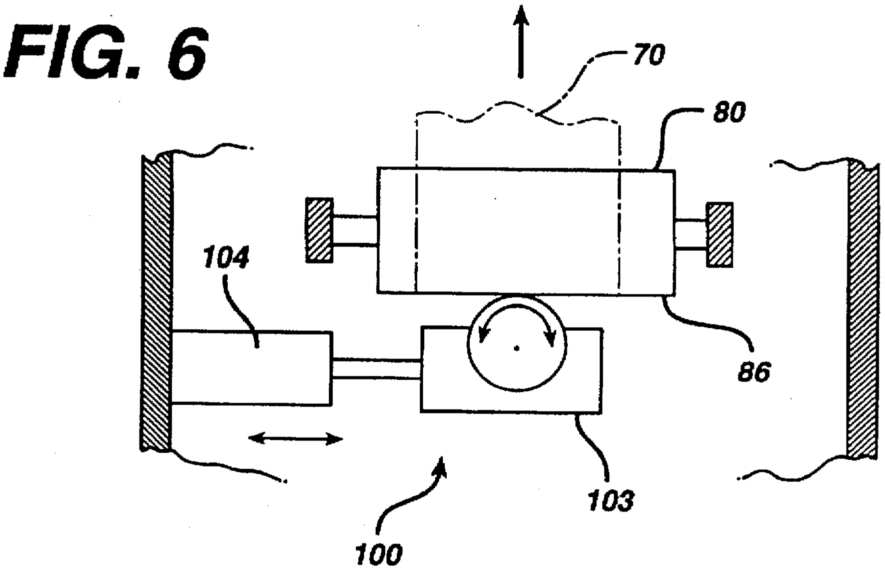
FIG. 6 illustrates, on an enlarged scale, a diagrammatic sectional view through the perforating knife assembly for perforating the laminated web taken along line 6—6 in FIG. 3.
Figure 7:
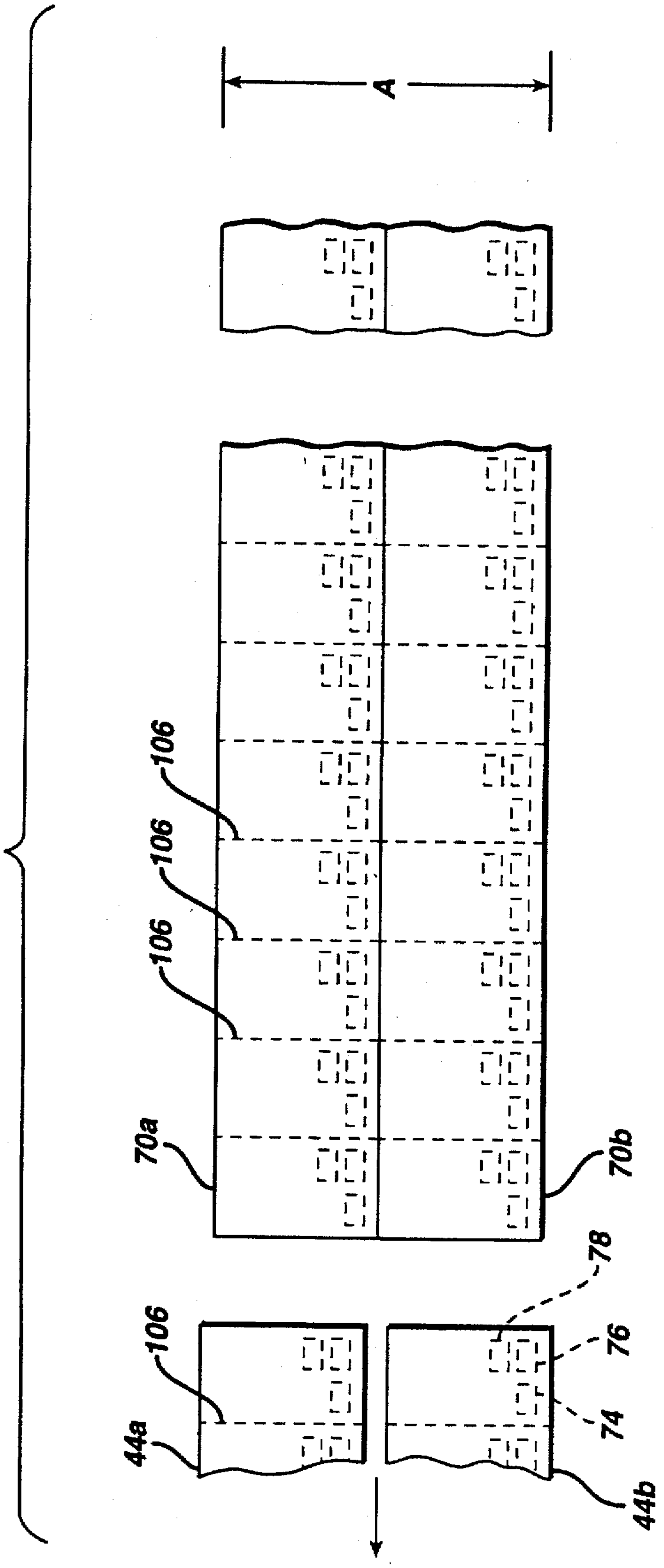
FIG. 7 illustrates, generally diagrammatically, a plan view of the laminated web utilized for forming the cover structure and printed labels for the array of blister packages.
Figure 8:
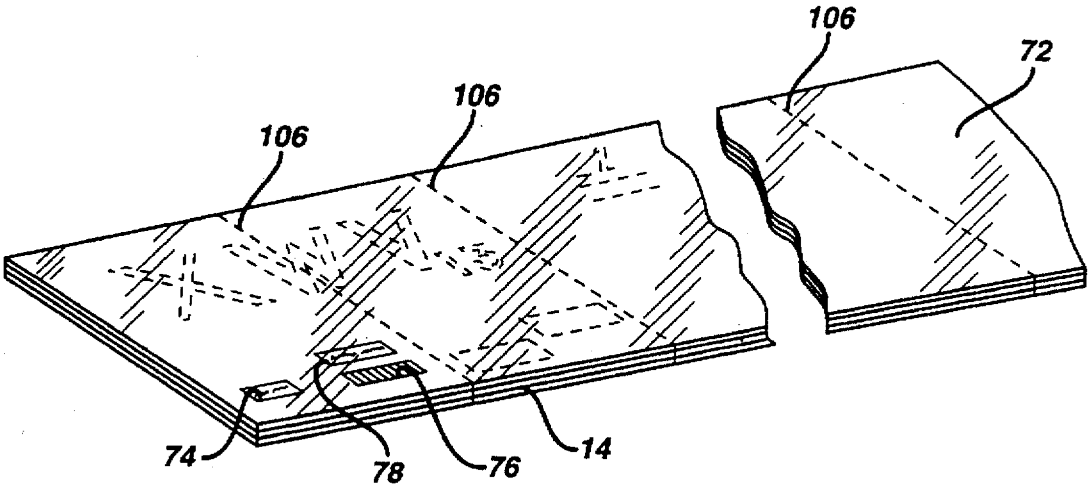
FIG. 8 illustrates a portion of the web of FIG. 7 shown subsequent to the imprinting, perforating, slitting and severing into segments thereof.

Located in close proximity with the lower circumferential surface portion 86 of the drum 80 are a plurality of perforating knives 100, which may be serrated or toothed disc-shaped blades, as shown schematically in FIG. 6, oriented coaxially with the longitudinal center axis the drum 80, and which are adapted to be reciprocated longitudinally therealong through the intermediary of displacements being imparted thereto through a pneumatically-operated piston and cylinder device 104, to be able to cause the teeth or serrations on the perforating knife or blade surfaces to cut into the laminated web and produce perforation lines 106 in the laminate web, as shown in FIGS. 7 through 9, in a direction extending transversely of the longitudinal or machine direction of the laminate web.

A unique feature of the blades perforating the foil web against a hard surface 86 resides in that no particles are generated by this process, enhancing and ensuring a clean environment for the perforations.

The perforating knives or blades for forming the perforations, in this case four in number, are oriented so as to be angled radially towards the longitudinal center axis of the perforating drum 80, and their cutting edges are spaced with regard to each other so as to produce lines of perforations at mutually predetermined spaced intervals along the length of the laminate web 70, as described hereinbelow.

Arranged downstream of the perforating drum 80 in the direction of conveyance of the laminate web in the apparatus and mounted stationarily on an upper support 110 is a web slitting unit 112 equipped with a rotatable disc-shaped slitting blade or knife 114 oriented in the direction of conveyance for the web. Alternatively, instead of a rotary blade, the slitting may be effected by means of a "scissors-type" cutter or straight slitting blade. The slitting blade 114, during the conducting of the laminate web therepast, is intended to separate the web into two equally-sized continuous strips **70*a* and 70*b*, as shown in FIG. 7 of the drawings. The slitting knife unit 112, is fixedly located at a predetermined distance downstream of the perforating knives 100 and drum 80 and includes a sensor arrangement for scanning the characters on the laminate web surface imprinted thereon by the printing unit 60**.

Supported for movement along a guide rail structure 120 of the apparatus 30 is a carriage 122 possessing spaced upright supports 124, 126 and mounting a cutting knife 128 movable transversely of the direction of conveyance of the laminated web through apparatus 30, enabling the cutting knife 128 to sever the perforated and longitudinally slit laminate web portions **70*a*, 70*b* into segments of predetermined length commensurate with the number of adjacently located base members of arrays of blister packages to be produced which are to be jointly covered thereby as a unitary printed label covering. The movable carriage 122 for the transverse cutting knife 128 is equipped with openable and closable slide grippers 130 for selectively engaging opposite side edges of the laminate web portions 70*a*, 70*b*. Movable vacuum devices 140 possessing suction units 142 are adapted to be reciprocated vertically proximate the downstream outlet end of apparatus 30 so as to be capable of engaging severed laminated web segments and transporting them towards the dial mechanism of the installation 10 for placement on the plurality of base members which are located in the pallets 18 so as to produce completed arrays of blister packages 12 as shown in FIG. 9**, upon being adhered or sealed to each other.

The graphics or indicia grouping position on the laminate web 70 is verified by a photoelectric sensor mounted just above the foil surface. Each time the web is pulled and is ready for cutting, the sensor state is tested to verify that diagonal stripes printed on the web have been positioned properly prior to cutting to ensure proper graphic grouping in the web.

OPERATION OF THE APPARATUS

The operation of the apparatus 30 which is employed to produce the unitary printed label cover structure for arrays of blister packages is now described as being essentially as follows:

A supply roll 44 consisting of a continuous web of flexible multi-layered laminated material as described hereinabove which; for example, may be of a construction as disclosed in copending U.S. patent application Ser. No. 08/257,795, filed Jun. 10, 1994 pending, is mounted on the shaft and rotatable pulley unit 42, and the web is entrained over the idler and tension rollers 50, 52 so as to be conducted into and through the printing unit 60. In connection with the foregoing, reference may be had to FIG. 7 illustrating, for purposes of clarity only, the web of material 44 being conveyed through the apparatus 30 in an imaginary generally flat planar motion.

The forward or advancing motion to the laminated web 44 is effected through released sliding along the edges of the web by the sliding grippers 130 of the movable carriage 122 when the latter is displaced rearwardly along the direction of double-headed arrow C towards the web slitting unit 112; the edges of the web 44 thereafter being engaged by the sliding grippers 130, and the web then drawn forwardly upon advance of the carriage 122 in the opposite direction along arrow C towards the outlet end of the apparatus 30. This, in effect, will impart an intermittent or indexed advance or forward movement to the laminated web 70 through the apparatus 30.

During intervals when the edges of the laminated web 70 are not clampingly engaged by the sliding grippers 130, stationary grippers 113 proximate the slitting unit 112 may be adapted to engage the laminated web 70 so as to prevent any longitudinal shifting or possible flexing or bowing of the web which would negate the accurate or precisely measured indexed advance thereof and prevent the formation of the desired printed label covers for the blister packages.

In the printing unit 60, the laminated web 70 is imprinted, for example through thermal printing, with suitable content identifying characters, representative of lot and batch number, and fitting parameter, such as lens power of the contact lens which is to be contained in each subsequently to be formed blister package. As illustrated, the laminated web 70 is approximately twice the width of a single length of a base member of a blister package 12 and; in effect comprises the width A of the two base members in a contacting end-to-end relationship, as shown in FIG. 9 of the drawings.

As the laminated web is conveyed from the printing unit 60 over a further series of idler rollers and dancer rollers 82, 84 which impart the necessary tension to the laminated web 70, it is passed about rotatable drum structure 80 of perforating knife arrangement 100. In this case, the web is directed to extend about the lower circumferential surface portion 86 of the drum as the perforating knives are adapted to pass transversely across the width of the laminated web 70 during the period when the web is stationary.

As the perforating knives 100 are displaced transversely across the bottom of the drum 80 by the piston and cylinder device 104, the serrated or toothed edges (not shown) cut into the laminated web 70 so as to produce lines of microperforations, as shown in FIGS. 7 through 9, which are spaced apart 30 mm; in essence, the width of a respective base member of a blister package 12. Herein, there are provided four (4) perforating knives 100 to form four perforation lines in parallel spaced relationship, with a total distance between the perforating knives 100 of 90 mm. Suitable air cylinders (not shown) may also be provided to control the depth of the perforations being imparted to the laminated web 44 by the perforating knives 100.

As the leading end of the laminated web 70 is engaged by the sliding grippers 130 of the reciprocable carriage 122, upon being in the position in which the carriage is retracted towards the slitting knife unit 112, with the edge grippers 130 engaging the web, the carriage 122 is displaced forwardly towards the outlet end of the apparatus 30, drawing the web forwardly by a precise distance, in this instance by 150 mm, so as to provide a web length of 60 mm between each set of four lines of perforations so as to ultimately provide for the 30 mm widths of five adjoiningly connected base members for an array of blister packages. The carriage 122 upon being moved forwardly, causes laminated web 70 to be drawn through the web slitting unit 112 such that the rotary blade 112 slits the web into two continuous web portions 70*a*, 70*b*, each one-half the width A shown in FIGS. 7 and 9.

Upon the carriage 122 having completed the forward advance along guide rail structure 120, the transversely oriented cutting knife 128 located between upright supports 124 and 126 is actuated so as to sever the perforated and longitudinally slit laminated web portions 70*a* and 70*b* into the 150 mm lengths at precisely the middle of the 60 mm unperforated distance between the successive sets of four perforation lines. This resultingly produces five interconnected printed label covers from each severed web segment 44*a* and 44*b*.

Subsequent to the severing of the laminated web portions 70*a*, 70*b* into the required segments each of 150 mm in length, the carriage 122 is retracted part of the distance towards the slitting knife device 112 so as to enable suitable vacuum structures (not shown) 160 to each engage respectively one of the severed web segments and to transport them to the dial mechanism of installation 10 for placement over ten base members on a pallet 18 so as to form two arrays each of five interconnected blister packages 12, as shown in FIG. 9.

The extent and accuracy in the forward indexed movement and displacement of the laminated web 70, as shown in FIG. 7, is controlled through the intermediary of suitable sensors 92, such as camera devices, located adjacent the infeed end of the stationary drum 80 of the perforating knife structure 100, as sensors (not shown) in the drum facing the web 70, and whereby the indexed displacement of the cutting knife-mounting carriage 122 along the longitudinal extent of the apparatus 30 is also calibrated by sensors 172 located at the slitting device 112 which will read the precision in the positioning of characters imprinted on the laminated web by the printing unit 60 in correlation with the location of the characters entering the perforating station so as to ensure that the distance the web has been indexed forwardly within predetermined parameters or variances, such as ±0.2 mm for each intermittent advance of 150 mm for the laminated web. This is measured by the sensors 172 through scanning of the indicia or characters imprinted on the laminated web structure downstream of the slitting knife arrangement and also the calibration in relation thereto by the sensors 92 scanning the positioning of the printed character in each of an appropriate printing field on the web. In the event that the displacement is inaccurate, in effect, exceeds the ±0.5 or preferably 0.2 mm variation allowed for each 150 mm of web advance, the apparatus 30 may include suitable structure for ejecting the incorrectly severed segments of the laminated web, and concurrently provide for an adjustment in the web feed mechanism of the apparatus, i.e., the displacement of carriage 122, so as to correlate the printed characters on the web 70 being scanned by the sensors 92, 172 with the extent of forward displacement of the laminated web.

Reverting to the web perforating arrangement, the latter of which includes perforating knives 100 in the form of four rotary cutting blades, each having perforating teeth extending about the circumference of the disk-shaped blade member, for example 40 blades per inch of circumference to form microperforations, as shown in FIG. 6, the blades are supported in a housing 103 which is reciprocable across the width of the laminated web 70 along the lower surface 86 of the drum 80, upon the web being intermittently advanced into a stationary period at the drum, the four perforating blades as illustrated being spaced with respect to each other at the points of perforating contact with the laminated web so as to define a longitudinal spacing between perforation lines of 30 mm, four such perforations lines being formed, and thereafter the laminated web being advanced by the apparatus to produce a double spacing of 60 mm between sets of perforation lines; in effect, skipping one perforation line which, in lieu thereof becomes the transverse severing or cutting edge for the transverse cutting knife 128 to form the web segments for conveyance to the dial mechanism of installation 10.

Figure 10:
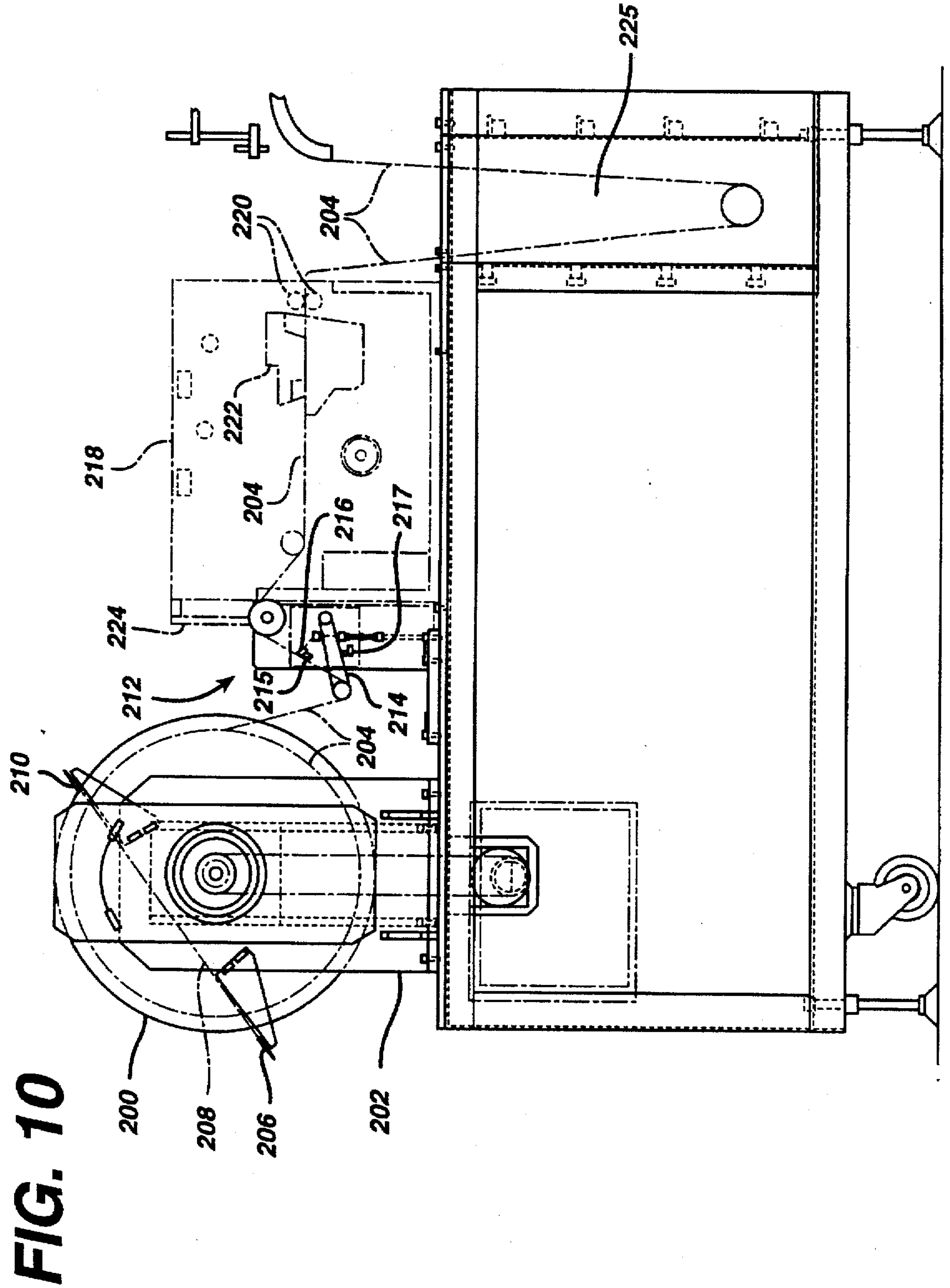
FIGS. 10 and 11, when assembled together with FIG. 10 on the left and FIG. 11 on the right, present a front elevational view of a further embodiment of apparatus for processing a continuous strip of laminated foil supplied on a supply roll into a plurality of printed label-forming segments, each of which is adapted to interconnect and sealingly cover a row of five containers, such as the base members of blister packages designed to each respectively contain a hydrophilic contact lens in a sterile saline solution.
Figure 11:
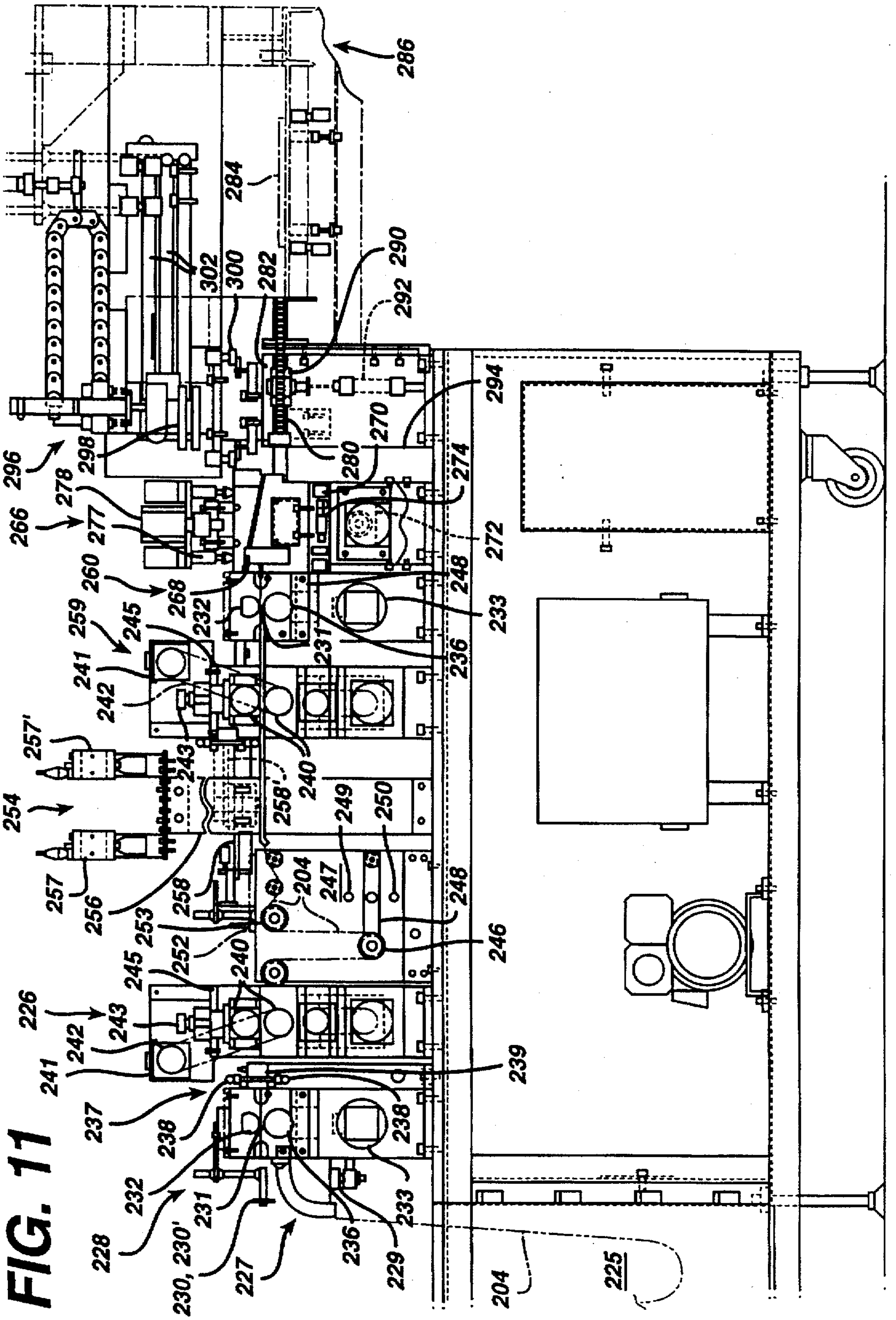

FIGS. 10 and 11, when assembled together with FIG. 10 on the left and FIG. 11 on the right, present a front elevational view of a further embodiment of apparatus for processing a continuous strip of laminated foil supplied on a supply roll into a plurality of printed label-forming segments, each of which is adapted to interconnect and sealingly cover a row of five containers, such as the base members of blister packages designed to each respectively contain a hydrophilic contact lens in a sterile saline solution.

The apparatus proceeds from a supply roll 200 on a bobbin unit 202 which has a continuous strip of laminated foil 204 thereon, and includes a foil level sensor. The foil level sensor includes a beam projector 206 which projects a narrow beam of light 208 along a path, which will be clear when the supply roll is nearly empty, to a photodetector 210, an output from which indicates that the supply roll is nearly empty.

The laminated foil strip 204 is processed to produce a plurality of strips of covers, with each cover strip covering five adjacent blister packages arranged in a 1×5 row. Each cover strip for five adjacent blister packages is approximately 150 mm long and 45 mm wide. The laminated foil strip is supplied in a strip 90 mm wide, and is slit longitudinally down the middle to produce the 45 mm wide cover strips. The laminated foil strip is perforated across its width at four locations between each pair of adjacent blister packages to facilitate the subsequent separation of a single blister package from the strip. The laminated foil strip is also cut completely across its width (90 mm) after each length of five packages (150 mm). Each blister package has printed thereon pertinent information such as the run lot number, the power of the contact lens packaged therein, and an expiration date. The laminated foil strip is divided into fields for each blister package, as illustrated in FIGS. 7 and 8, and each blister package has a generally blue background field with a white field therein on which the pertinent information is printed.

The apparatus of FIGS. 10 and 11 functions to detect the widthwise border between each blue background field and each white printing field, and also to detect the background foil graphics to generate timing and positional signals to print appropriate information thereon in the printing field, perforate the strip across the width thereof between each adjacent label in a strip of five labels, inspect each individual cover for the presence and quality of appropriate printing thereon, cut completely across the width of the laminated foil strip between adjacent strips of five covers, slit the laminated foil strip lengthwise down the middle between side by side strips of five covers, and finally transfer each strip of five covers to a packaging machine for application as covers on a row of five adjacent blister package bases.

The continuous strip of laminated foil 204 proceeds from the supply roll 200 to a foil guide assembly 212 which includes a pivoted tensioning arm 214, pivoted about 215, the weight of which maintains the laminated foil strip 204 under tension through a subsequent printing machine 218. The foil guide assembly 212 includes upper and lower proximity detectors 216, 217 for detecting upper and lower positions of the pivoted tensioning arm. The upper position detector 216 deactivates drive rollers in a subsequent printing machine 218, while the lower position detector 217 activates the drive rollers in the subsequent printing machine 218.

The laminated foil strip 204 proceeds from the foil guide assembly 212 into a printing machine 218, which can be a thermal printing type of printer. The printer 218 includes drive rollers 220 near its exit which advance the laminated foil strip intermittently therethrough between successive printings by a printhead 222. The printer also includes a photodetector 224 positioned to detect the widthwise border between the blue background and white printing fields to accurately control the position of the laminated foil strip for each printing, when it prints appropriate product information on each white printing field.

The printed laminated foil strip then proceeds from the printer 218 downwardly into a stock box 225, which is shown on the right side of FIG. 10 and the left side of FIG. 11, for temporary accumulation therein. The printed laminated foil strip is then pulled forwardly from the accumulation stock box 225 by a feed roller unit 226. The strip is drawn from the stock box 225 over a suction brake 227, which maintains the laminated foil strip under tension, and into a perforation cutter 228.

The suction brake 227 includes a valve 229 which controls the vacuum applied to the suction brake and thereby the tension on the laminated foil strip, which is advantageous during the perforation cutting operation. Two photodetectors 230, 230' are positioned above the laminated foil strip as it travels across the suction brake 227. One photodetector 230 detects each widthwise border between the blue background field and a white printing field, and determines where the perforation cutter will cut the perforations, and a second photodetector 230' detects the background graphics, and determines the border between the end of one 1×5 strip of covers and the beginning of another 1×5 strip of covers, which is not perforated.

Figure 12:
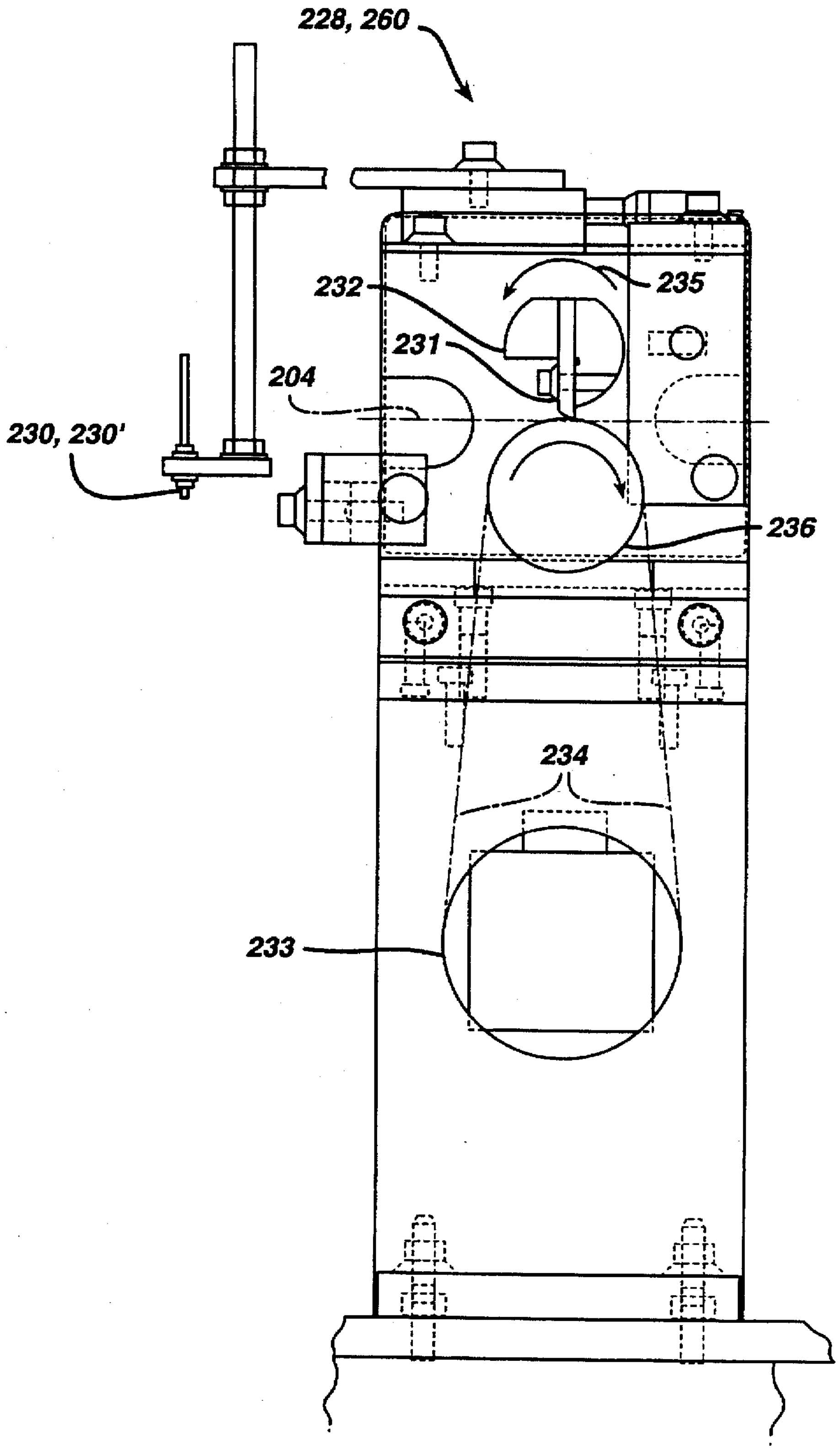
FIG. 12 illustrates an enlarged front elevational view of a perforating cutting unit which includes a flying (rotating) knife blade having a shape similar to that of a guillotine blade, which perforates each laminated foil strip widthwise four times, once between each pair of adjacent covers in each strip of 1×5 covers.

The perforation cutter 228 includes a flying knife cutter which perforates the laminated foil strip widthwise four times, once between each pair of adjacent covers in each strip of 1×5 covers. FIG. 12 illustrates an enlarged front elevational view of the perforating cutting unit 228 which includes a flying knife blade 231 which has a shape similar to that of a guillotine blade. The blade has a length perpendicular to the paper in FIG. 12, and extends across the 90 mm width of the two side by side strips of covers. The blade 231 is supported on a shaft 232 and is driven by a stepper motor 233, via pulleys and a belt 234 to rotate in the direction of arrow 235 during a cut, and the strip of laminated covers, which extends from the left to the right in FIG. 12, is perforated between the blade edge and a roller 236 positioned widthwise beneath the strip of laminated covers.

The perforated laminated foil strip is drawn from the perforation cutting unit 228 through a cleaning unit 237, which includes a vacuum applied through vacuum ducts 238, and felt cleaners 239 on each side of the laminated foil strip, into the feed roller unit 226.

Figure 13:
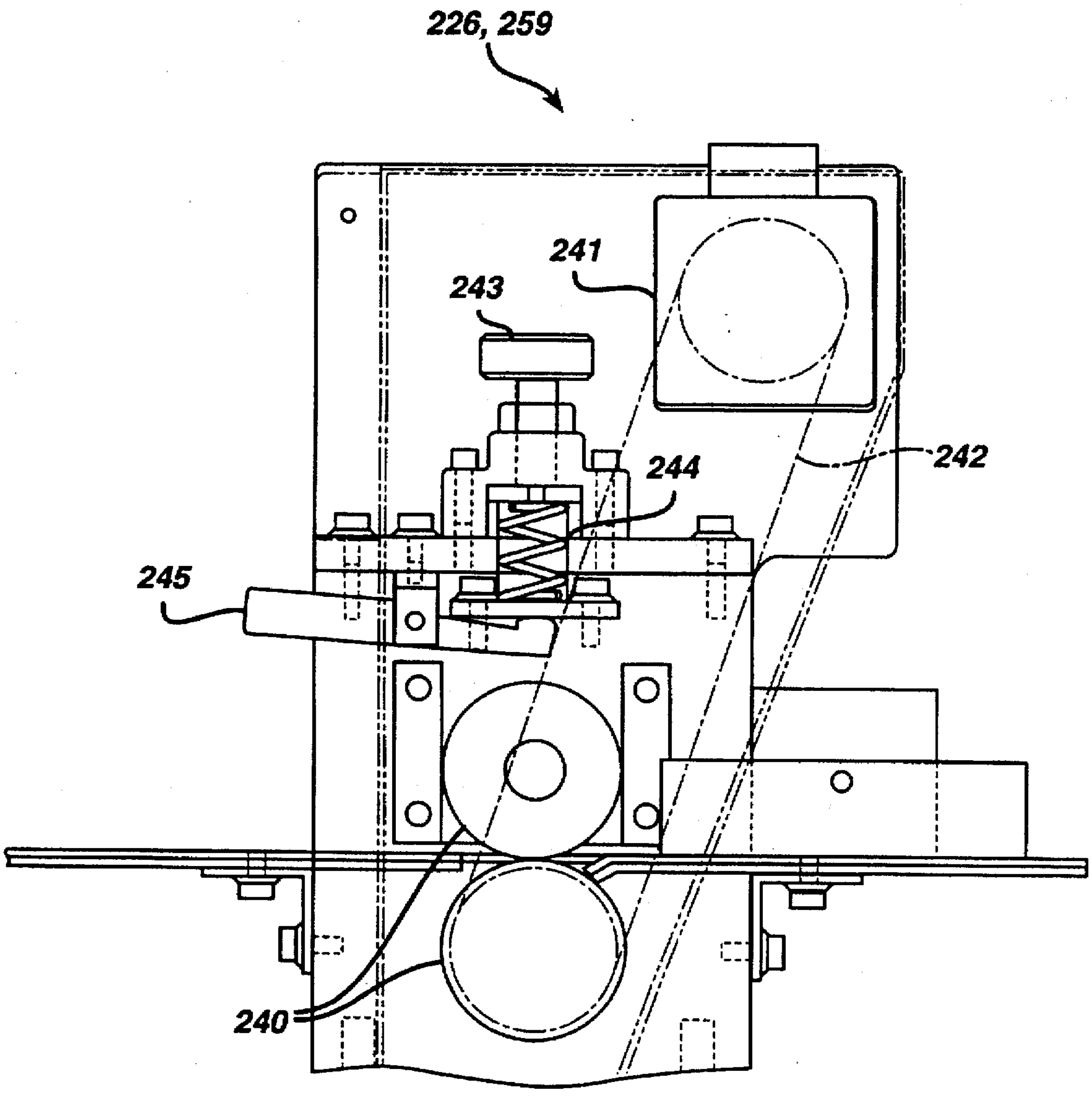
FIG. 13 is an enlarged front elevational view of a feed roller unit which includes upper and lower rubber drive rollers, between which the laminated foil strip is intermittently driven by a stepper motor drive, and wherein the apparatus of FIGS. 10 and 11 includes two such feed roller units.

FIG. 13 is an enlarged view of the top of the feed roller unit 226 which includes upper and lower rubber drive rollers 240, between which the laminated foil strip is intermittently driven by a stepper motor 241 via a pulley and belt 242 drive. The feed roller unit 228 includes an adjustment 243 on the top thereof which controls the tension on the laminated foil strip by controlling the force with which a spring 244 presses the two drive rollers together. A release lever 245 is also provided to release and disengage the two drive rollers. In this arrangement, one photodetector 230 detects each passing blue background/white printing border, and a second photodetector 230' detects the background graphics, and responsive thereto, the feed roller unit 226 positions each widthwise border between adjacent covers in a 1×5 cover strip beneath the flying knife cutter to provide perforations thereat. Perforations are not provided at each fifth border between lengthwise adjacent covers, as the 1×5 cover strips are subsequently completely severed at those locations.

The laminated foil strip then proceeds from the feed roller unit 226 downwardly around a dance roller 246 in a dance roller unit 247 which maintains the laminated foil strip under tension. The dance roller unit includes a pivoted tensioning arm 248, the weight of which maintains the laminated foil strip 204 under tension. The dance roller unit includes upper and lower proximity detectors 249, 250 for detecting upper and lower positions of the pivoted tensioning arm. The upper position detector deactivates drive rollers in a subsequent feed roller unit 259, while the lower position detector activates the drive rollers in the subsequent feed roller unit 259. The laminated foil then proceeds upwardly by a photodetector 252, through additional rollers 253 in the dance roller unit 247, and into an optical inspection station 254.

Figure 14:
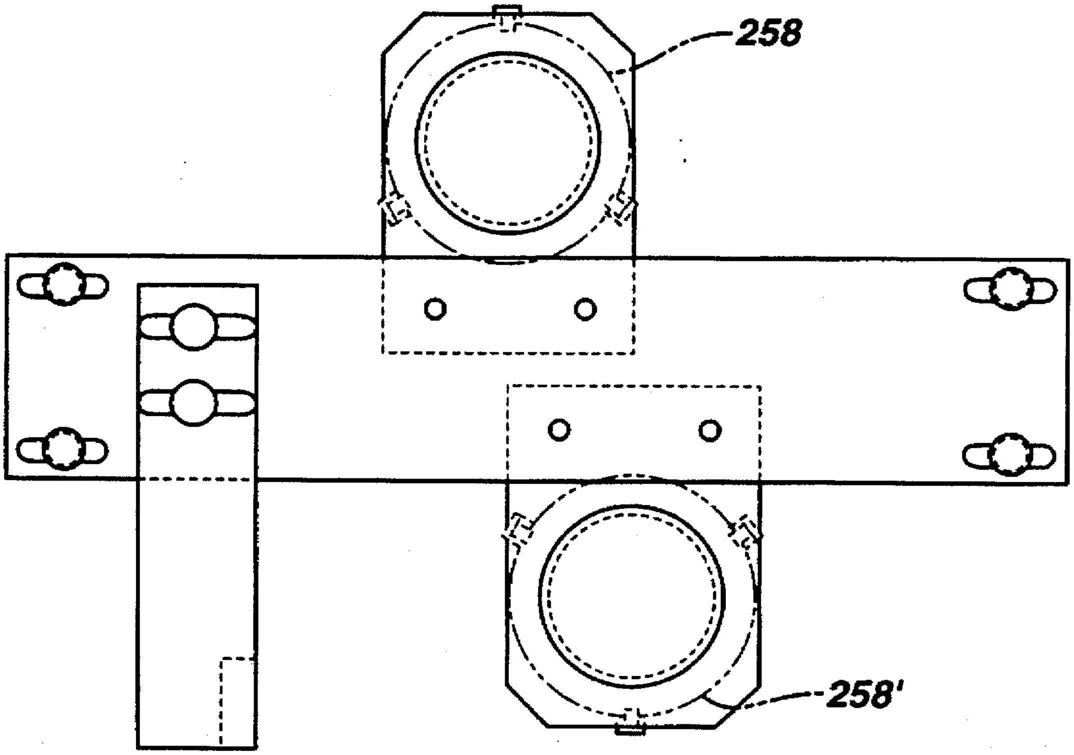
FIG. 14 is a top plan view of two circular arrays of optical fibers for providing constant illumination for two print fields of two separate covers, in an optical inspection station in which two cameras provide a pixel image of each printed field of each cover, which is analyzed using art known image analyzing techniques.
Figure 15:
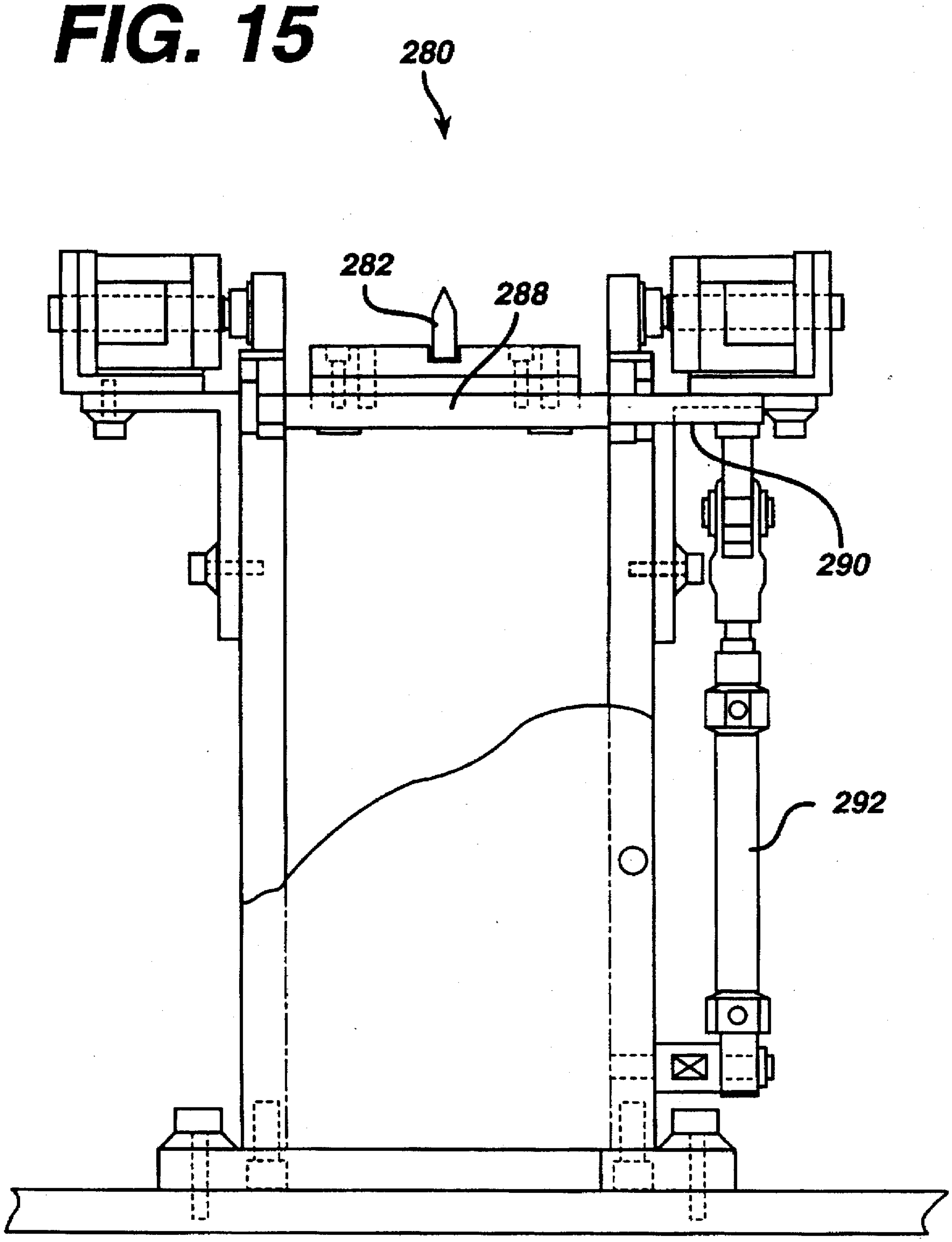
FIG. 15 is a side elevational view of a separating unit which includes a pivoted trap door arrangement for separating cover strips which have passed inspection in the optical inspection station from cover strips which have failed inspection in the optical inspection station.

The optical inspection station 254 has a camera frame 256, in which two cameras 257, 257' are positioned, one above each side of the side by side strips of covers. The photodetector 252 triggers the two cameras to provide a pixel image of each printed field of each cover, which is analyzed using art known image analyzing techniques for proper print position, print quality (with full characters), and the correctness of the printed information. As illustrated in FIG. 14, each print field is constantly illuminated by a circular array 258, 258' of optic fibers, one for each of the two cameras. The two cameras are positioned sequentially along the path of the laminated foil strip simply to provide sufficient space for each as there is no requirement that they image side by side covers.

The laminated foil strip proceeds from the optical inspection station through a second feed roller unit 259 which pulls the laminated foil strip from the dance roller unit 247 through the optical inspection station 254 and directs the laminated foil strip into a second cutting unit 260. The second feed roller unit 259 is substantially identical to the first feed roller unit 228, and also includes upper and lower rubber drive rollers 240, between which the laminated foil strip is intermittently driven by a stepper motor drive. The feed roller unit 259 includes an adjustment 243 on the top thereof which controls the tension on the laminated foil strip by controlling the force with which a spring 244 presses the two drive rollers together. A release lever 245 is also provided to release and disengage the two drive rollers.

The second cutting unit 260 is substantially similar to the first cutting unit 288, and includes a flying knife blade 231 which has a shape similar to that of a guillotine blade. The blade has a length perpendicular to the paper in FIG. 12, and extends across the 90 mm width of the two side by side strips of covers. The blade 231 is supported on a shaft 232 and is driven by a stepper motor 233 by pulleys and a drive belt 234 to rotate in the direction of arrow 235 during a cut, and the strip of laminated covers, which extends from the left to the right in FIG. 12, is perforated between the blade edge and a roller 236 positioned widthwise beneath the strip of laminated covers. However, the blade of this second cutting unit 260 is designed to sever the strip entirely across the width thereof after each strip of five covers. The output of the second cutter unit 260 is a 2×5 array of covers, with four equally spaced perforations thereacross which were produced by the first cutter unit 228.

Each 2×5 array of covers is then fed into a slit cutter 266 which slits the array lengthwise down the middle to produce two 1×5 strips of covers. The slit cutter 266 includes a set of drive rollers 268 at its inlet which pull each 2×5 array of covers from the cutter unit 260 and a set of drive rollers 270 at its output which push each 1×5 row of covers into the next separating unit 272. The drive rollers 268, 270 are driven by a stepper motor 272 by pulleys and belts 274. The slit cutter 266 includes a bottom support platen 275, which includes a longitudinal slot to accommodate the cutting blade, and a slit cutting blade 276 which is supported on guide rails 277 and driven by a pneumatic cylinder 278 to press against and fit into the longitudinal slot in the bottom support platen during a slitting operation. A foil presence sensor near the right side of support platent 275 detects the leading edge of a 2×5 array of covers when the array is in a proper position for cutting to initiate a slit cutting operation.

The two 1×5 strips of covers then proceed, driven by the exit rollers 270, into a separating unit 280, which separates strips which have passed inspection in the optical inspection station 254 from strips which have failed inspection in the optical inspection station 254. FIG. 11 shows a side elevational view of the separating unit which includes a central ramp guide 282 which has a width which divides the two 1×5 strips by a distance equal to the distance between adjacent 1×5 rows of package bases supported in a pallet 284 in a subsequent packaging arrangement 286. The separating unit 280 includes a pivoted trap door plate 288, pivoted about a shaft at 290 near its right end in FIG. 11, which is actuated by a pneumatic drive cylinder 292 controlled by a system controller. When the system controller actuates the trap door 288, after the optical inspection station 254 fails either of a side by side pair of cover strips, and the failed 1×5 strips fall into a reject bin 294.

Covers which have passed inspection are positioned in side by side rows on the plate 288, from which they are transferred by a pick and place linear foil transfer robotic unit 296, having a loading support plate 298 with three depending suction cups 300 for each 1×5 strip, to a support pallet 284 in the packaging machine 286 having an endless conveyor comprising a linked series of support platens 284. Each support platen supports a 2×5 array of package bases, each of which has a hydrophylic contact lens immersed in a sterile saline solution. Each support platen is temporarily stopped at a cover application station as shown in FIG. 11 at which the robotic loading arm 296, which translates along tracks 302, applies a 1×5 strip of covers over each 1×5 row of package bases. In an alternative embodiment, the support plate 298 with the depending suction cups 300 might be replaced by a support plate with simply a series of vacuum application holes to hold each 1×5 strip of covers (i.e., the depending suction cups have been eliminated).

The robotic loading arm includes an associated vacuum switch, and when two side by side strips of covers are not present on the loading platform, the vacuum switch senses a loss of vacuum caused by the absent strips and notifies the system controller. The packaging machine subsequently heat seals each 1×5 strip of covers to a row of five blister package bases, each having a contact lens immersed in a saline solution therein. The packaging machine is described in detail, U.S. Pat. No. 5,565,059 (Edwards et al.).

One advantageous feature of the arrangement of FIGS. 10–15 is that an operator needs to input information such as batch/lot number, lens power, expiration date, etc. only once at an operating console, which might be located on a terminal box 304 and that information is directed by the system controller to both the printer and the inspection station, such that the same information does not have to be entered twice, as in prior art arrangements.

From the foregoing, it becomes readily apparent that the apparatus and method provides for a unique and highly precise system of imparting suitable printing, perforations, slitting and severing of the laminated web to produce segments prior to placement thereof onto the base members containing the contact lenses in order to form the required printed label covers for arrays of interconnected blister packages.

Other aspects of the invention may provide imparting pneumatic pressure to the perforating blades or knives which, as required, may exert increased pressure of the knife cutting edges against the laminated web so as to force the knives deeper into the web during any sense the dulling of the knife edges. This may, of course, be implemented through suitable sensors (not shown) which determine the depth of the either partially deep or through microperforations in the laminated web at the web perforating arrangement.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. An apparatus for producing printed labels forming a strip of covers interconnecting a plurality of package bases, with each strip of covers being a segment severed from a continuous length of a laminated foil, including a framework for supporting the laminated foil along a predetermined path of movement, comprising:

a. a supply roll having a continuous strip of laminated foil thereon, the laminated foil strip comprising a series of individual covers, with each individual cover having background graphics and a print field on which appropriate product data is to be printed, the background graphics and the print field separated by a widthwise border which extends from one side of the strip of laminated foil to the other side;

b. a printer, including drive rollers which advance the laminated foil strip intermittently therethrough between successive printings by a printhead on successive print fields of successive labels;

c. a photodetector positioned to detect the widthwise borders between the background graphics and the print fields to accurately control the position of the laminated foil strip in the printer for each printing of appropriate product data on each print field, and d. a foil level sensor positioned adjacent to the supply roll, which sensor includes a beam projector which projects a narrow beam of light along a path, which will be clear when the supply roll is nearly empty, to a photodetector, an output from which indicates that the supply roll is nearly empty.

2. An apparatus for producing printed labels as claimed in claim 1, including an accumulator means for receiving the printed laminated foil strip from the printer for temporary accumulation therein.

3. An apparatus for producing printed labels as claimed in claim 1, including a foil guide assembly, receiving the laminated foil strip from the supply roll, for maintaining the laminated foil strip under tension as it enters the printer, wherein said foil guide assembly includes a pivoted tensioning arm, the weight of which maintains the laminated foil strip under tension, and the foil guide assembly includes upper and lower detectors for detecting upper and lower positions of the pivoted tensioning arm.

4. An apparatus for producing printed labels as claimed in claim 3, wherein the upper position detector deactivates the drive rollers in the printing machine, while the lower position detector activates the drive rollers in the printing machine.

5. An apparatus for producing printed labels as claimed in claim 1, wherein a perforation cutter perforates the printed laminated foil strip output of the printer, and includes a flying knife cutter which perforates the laminated foil strip widthwise a number of times, once between each pair of adjacent covers in each strip of covers, including a knife blade supported on a shaft which is driven by a motor to rotate during a cut, and the strip of laminated covers is perforated between the blade edge and a roller positioned widthwise beneath the strip of laminated covers.

6. An apparatus for producing printed labels as claimed in claim 5, including a first photodetector positioned to detect the widthwise borders between the background graphics and the print fields which determines where the perforation cutter will cut the perforations, and a second photodetector positioned to detect the background graphics which determines the border between the end of one strip of covers and the beginning of the next successive strip of covers, which is not perforated, and a feed roller unit is responsive thereto to position each widthwise border between adjacent covers in a cover strip beneath the flying knife cutter to provide perforations thereat, and perforations are not provided at borders between successive strips of covers.

7. An apparatus for producing printed labels as claimed in claim 5, including a feed roller unit for pulling the printed laminated foil strip output of the printer over a suction brake, which maintains the laminated foil strip under tension, and into the perforation cutter.

8. An apparatus for producing printed labels as claimed in claim 7, wherein the suction brake includes means for controlling the vacuum applied to the suction brake and thereby the tension on the laminated foil strip through the perforation cutter.

9. An apparatus for producing printed labels as claimed in claim 7, wherein the feed roller unit includes upper and lower rollers, between which the laminated foil strip is intermittently driven by a stepper motor.

10. An apparatus for producing printed labels as claimed in claim 9, wherein the feed roller unit includes an adjustment which controls the tension on the laminated foil strip by controlling the force with which a spring presses the two drive rollers together.

11. An apparatus for producing printed labels as claimed in claim 9, wherein the feed roller unit includes a release level to release and disengage the two rollers.

12. An apparatus for producing printed labels as claimed in claim 5, including a cleaning unit for cleaning the perforated laminated foil strip at the output of the perforation cutter, and the cleaning unit includes a vacuum applied through vacuum ducts and contact cleaning strips on each side of the laminated foil strip.

13. An apparatus for producing printed labels as claimed in claim 1, including a feed roller unit for pulling the printed laminated foil strip output of the printer into a perforation cutter.

14. An apparatus for producing printed labels as claimed in claim 13, wherein the feed roller unit includes upper and lower rollers, between which the laminated foil strip is intermittently driven by a stepper motor.

15. An apparatus for producing printed labels as claimed in claim 14, wherein the feed roller unit includes an adjustment which controls the tension on the laminated foil strip by controlling the force with which a spring presses the two drive rollers together.

16. An apparatus for producing printed labels as claimed in claim 13, including a dance roller unit, wherein the laminated foil strip proceeds from the feed roller unit into the dance roller unit, which has a dance roller which maintains the laminated foil strip under tension.

17. An apparatus for producing printed labels as claimed in claim 16, wherein the dance roller unit includes a pivoted tensioning arm on which the dance roller is mounted, the weight of which maintains the laminated foil strip under tension.

18. An apparatus for producing printed labels as claimed in claim 17, wherein the dance roller unit includes upper and lower detectors for detecting upper and lower positions of the pivoted tensioning arm, and the upper position detector deactivates drive rollers in a subsequent feed roller unit, and the lower position detector activates the drive rollers in the subsequent feed roller unit.

* * * * *